(12) United States Patent
Ono (10) Patent No.: US 11,084,194 B2
(45) Date of Patent: Aug. 10, 2021

(54) PURGE COVER FOR INJECTION MOLDING MACHINE

(71) Applicant: FANUC CORPORATION, Yamanashi (JP)

(72) Inventor: Mitsuhiro Ono, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 135 days.

(21) Appl. No.: 16/687,321

(22) Filed: Nov. 18, 2019

(65) Prior Publication Data

US 2020/0189162 A1 Jun. 18, 2020

(30) Foreign Application Priority Data

Dec. 13, 2018 (JP) .............................. JP2018-233581

(51) Int. Cl.
*B29C 45/17* (2006.01)

(52) U.S. Cl.
CPC .......... *B29C 45/1755* (2013.01); *B29C 45/17* (2013.01)

(58) Field of Classification Search
CPC ............ B29C 45/1753; B29C 45/1755; B29C 2045/1754
See application file for complete search history.

(56) References Cited

U.S. PATENT DOCUMENTS

| | | | | |
|---|---|---|---|---|
| 4,264,293 A * | 4/1981 | Rourke | ................... | B29C 33/04 425/445 |
| 6,655,947 B1 * | 12/2003 | Hehl | ....................... | B29C 45/17 425/151 |
| 8,709,311 B2 * | 4/2014 | Aebi | ................... | B29C 45/1701 264/37.14 |
| 10,661,490 B2 * | 5/2020 | Einfalt | .................. | B29C 45/176 |
| 11,007,691 B2 * | 5/2021 | Ono | ........................ | B29C 45/74 |

FOREIGN PATENT DOCUMENTS

| | | |
|---|---|---|
| JP | S52-134182 U | 10/1977 |
| JP | S57-188024 U | 11/1982 |
| JP | S58-067429 A | 4/1983 |
| JP | S58-087026 U | 6/1983 |
| JP | H05-269797 A | 10/1993 |
| JP | 2002-301557 A | 10/2002 |
| JP | 2013-226816 A | 11/2013 |

OTHER PUBLICATIONS

An Office Action; "Notice of Reasons for Refusal," mailed by the Japanese Patent Office dated Feb. 16, 2021, which corresponds to Japanese Patent Application No. 2018-233581 and is related to U.S. Appl. No. 16/687,321; with English language translation.

* cited by examiner

*Primary Examiner* — Joseph S Del Sole
*Assistant Examiner* — Thu Khanh T Nguyen
(74) *Attorney, Agent, or Firm* — Studebaker & Brackett PC (57) ABSTRACT

A purge cover for injection molding machine has a cover body having a nozzle through-hole allowing a nozzle of a cylinder to pierce through, an exhaust passage extending higher than the cylinder in an upward direction, and a discharge port communicating with the exhaust passage, and a plurality of exhaust plates disposed at the discharge port of the cover body. The plurality of exhaust plates have exhaust holes for air moving in the upward direction from the cover body, and the exhaust holes are arranged so as not to planarly overlap when the plurality of exhaust plates are disposed at the discharge port of the cover body.

3 Claims, 6 Drawing Sheets

PURGE COVER FOR INJECTION MOLDING MACHINE

This application is based on and claims the benefit of priority from Japanese Patent Application No. 2018-233581, filed on 13 Dec. 2018, the content of which is incorporated herein by reference.

BACKGROUND OF THE INVENTION

Field of the Invention

The present invention relates to a purge cover for injection molding machine.

Related Art

Conventionally, an injection molding machine is equipped with various covers which cover a cylinder, a nozzle and the like. Among them, a purge cover is configured in the periphery of a nozzle, so as to suppress the scattering of molding material during a purge operation (refer to, for example, Patent Documents 1, 2).

Patent Document 1: Japanese Unexamined Patent Application, Publication No. 2013-226816

Patent Document 2: Japanese Unexamined Patent Application, Publication No. 2002-301557

SUMMARY OF THE INVENTION

In an injection molding machine, when a cylinder, a nozzle or the like reaches a high temperature, the heated air stays inside the purge cover, and thus the surface of the purge cover reaches a high temperature. Therefore, a purge cover for injection molding machine should lower the temperature of the surface thereof, while suppressing the scattering of molding material.

An object of the present invention is to provide a purge cover for injection molding machine capable of lowering the temperature of the surface thereof, while suppressing the scattering of molding material.

(1) The present invention relates to a purge cover for injection molding machine (for example, a purge cover 20 to be described below) disposed in the periphery of a nozzle of a cylinder of an injection molding machine. The purge cover for injection molding machine includes a cover body having a nozzle through-hole (for example, a nozzle through-hole 215 to be described below) allowing the nozzle of the cylinder to pierce through, an exhaust passage (for example, a second cover 22 to be described below) extending higher than the cylinder in an upward direction, and a discharge port (for example, a discharge port 225 to be described below) communicating with the exhaust passage; and a plurality of exhaust plates (for example, a first exhaust plate 231 and a second exhaust plate 232 to be described below) disposed at the discharge port of the cover body. The plurality of exhaust plates have exhaust holes (for example, exhaust holes 231h and exhaust holes 232h to be described below) for air moving in the upward direction from the cover body, and the exhaust holes are arranged so as not to planarly overlap when the plurality of exhaust plates are disposed at the discharge port of the cover body.

(2) In the purge cover for injection molding machine according to (1), the exhaust hole may have an oval shape or a slit shape.

(3) In the purge cover for injection molding machine according to (1), the exhaust hole may have a circular shape.

The purge cover for injection molding machine according to the present invention is capable of lowering the temperature of the surface thereof, while suppressing the scattering of molding material.

DETAILED DESCRIPTION OF THE INVENTION

Some embodiments according to the present invention will be described below. All of the drawings attached to the present specification are schematic diagrams. Taking ease of understanding into consideration, the shape, scale, length/width ratio, and the like of each part are changed or exaggerated as compared to the actual ones. In the drawings, hatching indicating a cross section of a member will be omitted as appropriate. In the present specification and the like, terms for shapes and geometric conditions, and terms specifying the extent of these, for example, "parallel," "orthogonal" and "direction," include not only the exact meaning of the terms, but also ranges taken as substantially parallel and substantially orthogonal, and a range taken as substantially a targeted direction.

In the present specification and the like, an X direction corresponds to the direction which is parallel to the longitudinal direction of a cylinder 3 of the injection molding machine 1 and which is the front/back direction along the advancing/retreating direction of the cylinder 3. A Y direction corresponds to the left/right direction orthogonal to the X direction in a plan view. A Z direction corresponds to the direction which is orthogonal to the X-Y plane and which is the up/down direction (vertical direction). With regard to the front/back direction (X direction), an X1 direction corresponds to the front direction in which the cylinder 3 approaches a stationary platen 2, and an X2 direction corresponds to the back direction in which the cylinder 3 moves away from the stationary platen 2. With regard to the left/right direction (Y direction), a Y1 direction corresponds to the right direction in the drawings, and a Y2 direction corresponds to the left direction. With regard to the up/down direction (Z direction), a Z1 direction corresponds to the upward direction in the drawings, and a Z2 direction corresponds to the downward direction. It is noted that, in the present specification, "(something) direction" is also referred to as "(something) side" or "the side of (something)" as appropriate.

FIRST EMBODIMENT

Figure 1:
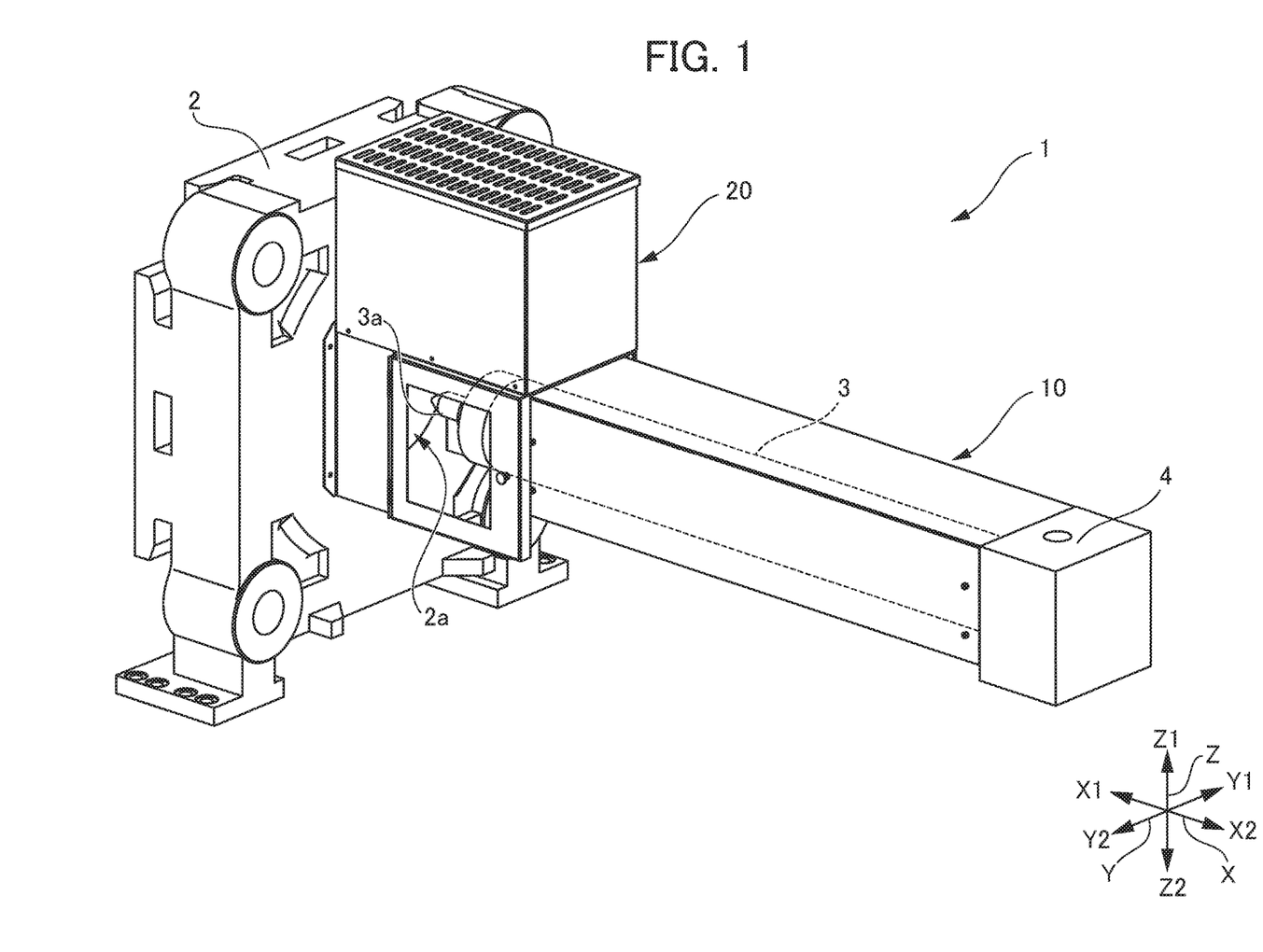
FIG. 1 is an oblique view partially showing an injection molding machine 1 equipped with a cylinder cover 10 and a purge cover 20 according to a first embodiment.
Figure 2A:
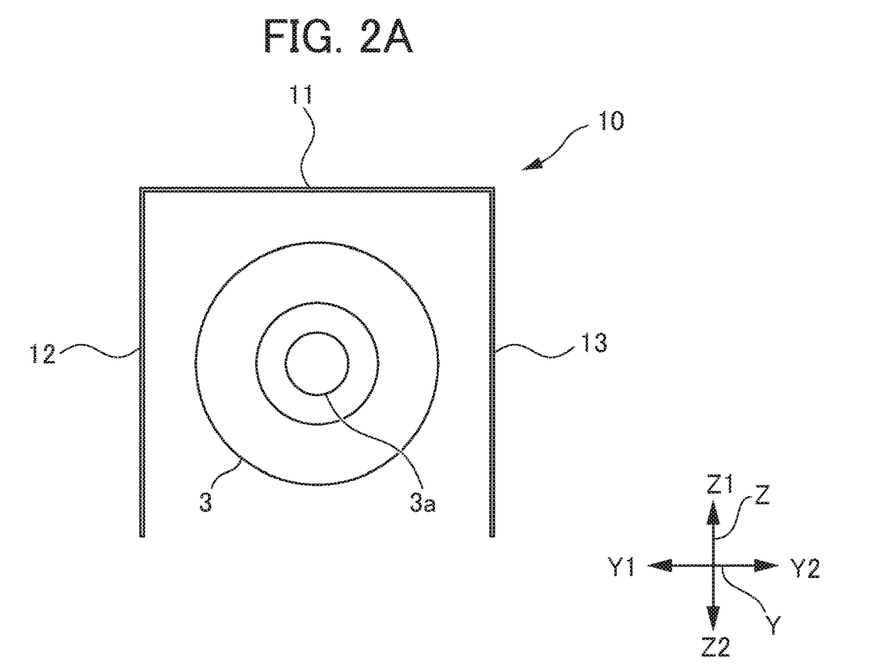
FIG. 2A is a cross sectional view showing a first configuration of the cylinder cover 10.
Figure 2B:
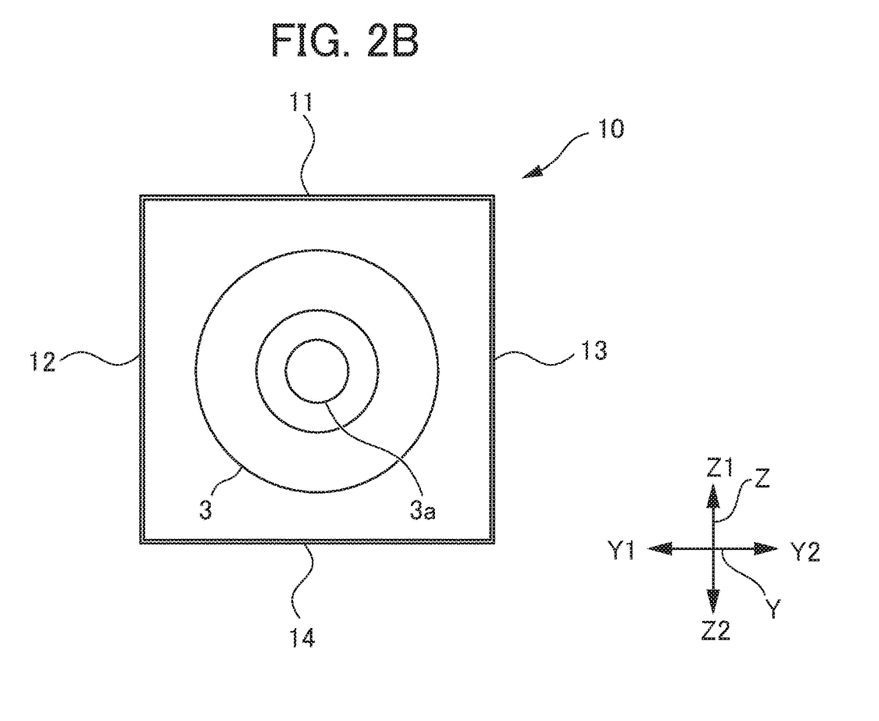
FIG. 2B is a cross sectional view showing a second configuration of the cylinder cover 10.
Figure 3:
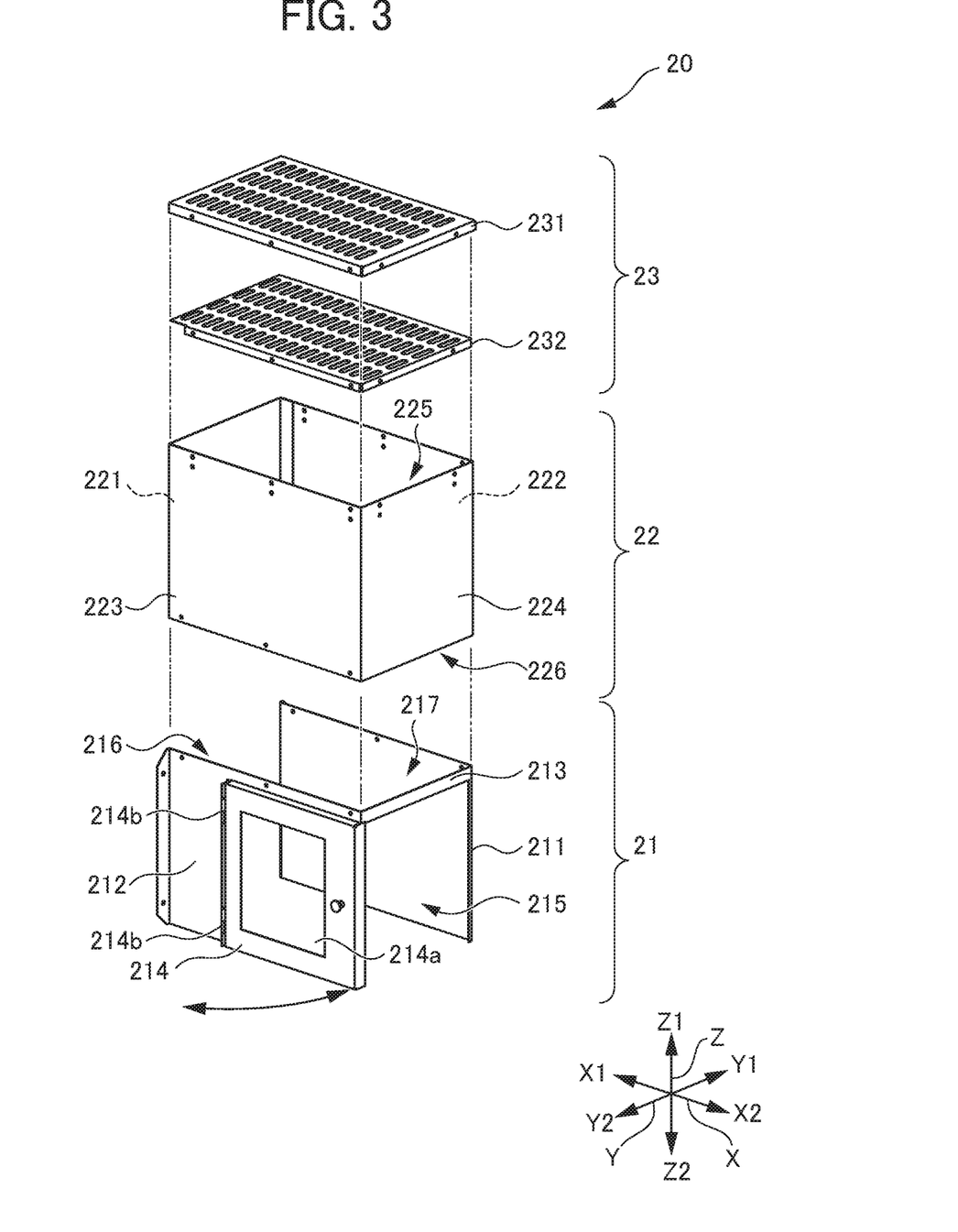
FIG. 3 is an exploded oblique view of the purge cover 20 according to the first embodiment.
Figure 4A:
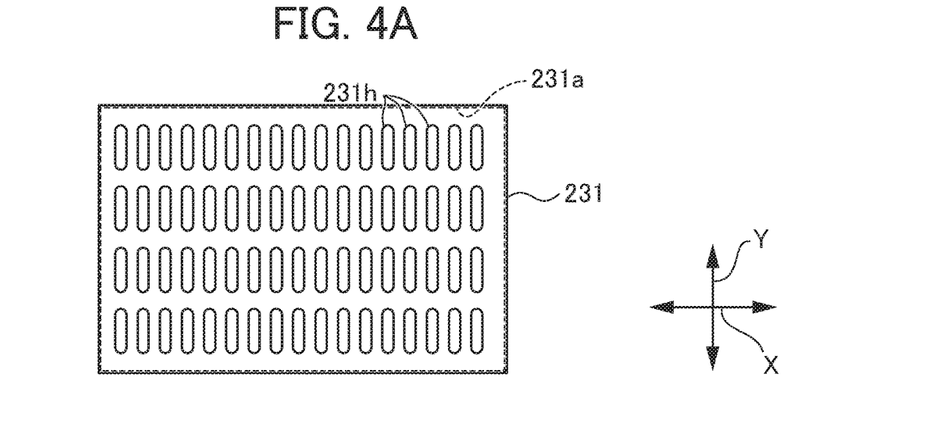
FIG. 4A is a plan view of a first exhaust plate 231.
Figure 4B:
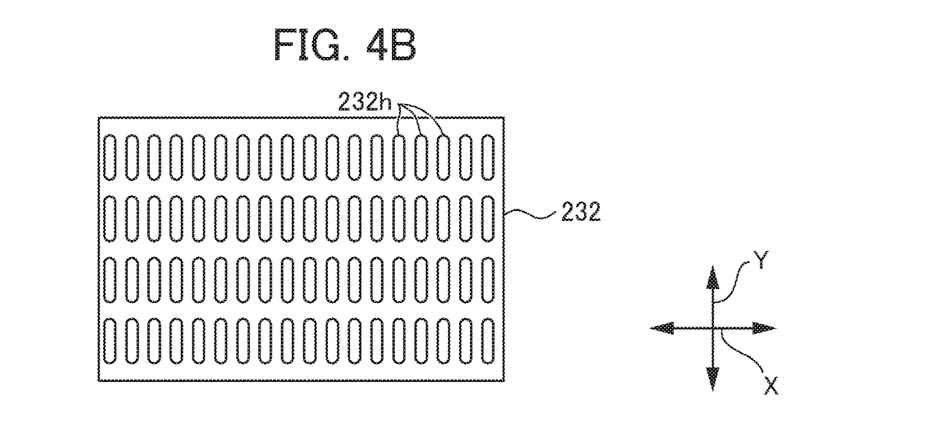
FIG. 4B is a plan view of a second exhaust plate 232.
Figure 4C:
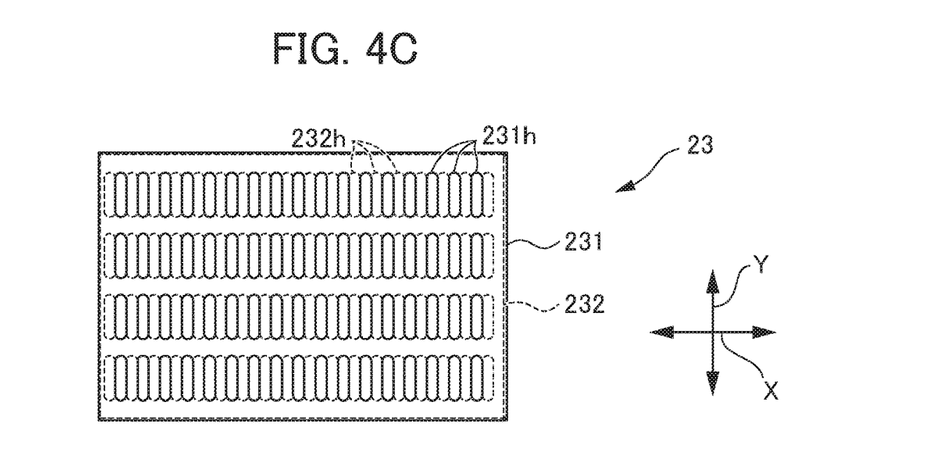
FIG. 4C is a plan view of an exhaust unit 23.

FIG. 1 is an oblique views partially showing the injection molding machine 1 equipped with the cylinder cover 10 and the purge cover 20 according to the first embodiment. FIG. 2A is a cross sectional views showing the first configuration of the cylinder cover 10. FIG. 2B is a cross sectional view showing the second configuration of the cylinder cover 10. Each of FIG. 2A and FIG. 2B shows a cross section parallel to the Y-Z plane, of the cylinder cover 10 viewed from the side of the stationary platen 2. FIG. 3 is an exploded oblique view of the purge cover 20 according to the first embodiment. FIG. 4A is a plan view of the first exhaust plate 231. FIG. 4B is a plan view of the second exhaust plate 232. FIG. 4C is a plan view of the exhaust unit 23.

As shown in FIG. 1, the injection molding machine 1 is equipped with the cylinder cover 10 and the purge cover 20 according to the present embodiment. It is noted that FIG. 1 shows the stationary platen 2, the cylinder 3, and a water-cooling jacket 4, as parts necessary for the description of the present embodiment out of the parts included in the injection molding machine 1. The respective parts of the injection molding machine 1 shown in FIG. 1 will be described first.

The stationary platen 2 is a structure supporting a stationary mold (not shown). The stationary platen 2 includes an insertion port 2a into which a nozzle 3a (to be described below) of the cylinder 3 is to be inserted. A movable platen (not shown) is disposed on the X1 side of the stationary platen 2. The movable platen is a structure supporting a movable mold (not shown). A mold is configured with the stationary mold supported by the stationary platen 2 and the movable mold supported by the movable platen. The movable platen is supported movably in the X (X1-X2) direction by a mold driving device (not shown). The movable platen is moved in the X2 direction and brought into intimate contact with the stationary platen 2 and thereafter the mold is closed mechanically, whereby a cavity is formed inside the mold. A molding is formed by filling the cavity with the molding material injected through the cylinder 3.

The cylinder 3 feeds a molten molding material (resin) into the mold. The cylinder 3 is driven by an injection device (not shown) to advance and retreat along the X direction. The cylinder 3 is driven to advance toward the mold, and a screw (not shown) disposed inside the cylinder 3 is rotated under the state where the nozzle 3a (to be described below) is inserted in the insertion port 2a of the stationary platen 2, whereby the inside of the mold is filled with a predetermined amount of the molding material. The cylinder 3 has, at the tip in the X1 side thereof, the nozzle 3a configured to feed the molten molding material into the mold. A heater (not shown) configured to melt the molding material filled in the cylinder 3 is disposed at the outer peripheral side of the cylinder 3.

The water-cooling jacket 4 is configured to cool the base side (X2 side) portion of the cylinder 3, inside the cylinder 3. In the water-cooling jacket 4, water for cooling the cylinder 3 is circulated. An injection device (not shown) is disposed on the X2 side of the water-cooling jacket 4. It is noted that the above-described injection molding machine 1, and the cylinder cover 10 and the purge cover 20 to be described below are installed on a base stand (not shown).

The cylinder cover 10 is a protective member which covers the periphery of the cylinder 3. The cylinder cover 10 disposed in the periphery of the cylinder 3 enables the suppression of contact with the cylinder 3 heated to a high temperature by the heater. The edge part of the cylinder cover 10 on the X1 side is inserted in a nozzle through-hole 215 (to be described below) of the purge cover 20. The edge part of the cylinder cover 10 on the X2 side is connected to the water-cooling jacket 4.

As shown in FIG. 2A, the cylinder cover 10 having the first configuration is configured with an upper plate 11, a right-side plate 12, and a left-side plate 13. The cylinder cover 10 having the first configuration has no lower plate (on the Z2 side), and thus has an inverted concave shape in a cross-sectional view. As shown in FIG. 2B, the cylinder cover 10 having the second configuration is formed in a substantially tubular shape configured with the upper plate 11, the right-side plate 12, the left-side plate 13 and a bottom plate 14. The configuration of the cylinder cover 10 may be either one of the first and second configurations described above. It is noted that the cylinder cover 10 may have any configuration as long as the configuration has a function equivalent to those of the first and second configurations.

The purge cover 20 is the protective member which covers the periphery of the nozzle 3a (the cylinder 3) on the X1 side of the cylinder cover 10. The purge cover 20 disposed in the periphery of the nozzle 3a enables suppression of the scattering of the molding material during the purge operation. The purge cover 20 according to the present embodiment enables discharge of the air heated in the periphery of the cylinder 3 to the outside, while suppressing the air from staying inside the purge cover 20, as will be described below. As shown in FIG. 3, the purge cover 20 includes a first cover 21, a second cover 22, and the exhaust unit 23. In the present embodiment, a cover body is configured with the first cover 21 and the second cover 22.

The first cover 21 is the member disposed at the lower side (Z2 side) in the purge cover 20. As shown in FIG. 3, the first cover 21 includes a right-side plate 211, a left-side plate 212, a connecting plate 213, and a door with window 214. The right-side plate 211 is a plate-like member disposed at the right side (Y1 side) of the first cover 21. The left-side plate 212 is a plate-like member disposed at the left side (Y2 side) of the first cover 21. The right-side plate 211 and the left-side plate 212 are connected by the connecting plate 213 at the upper part of the back side (X2 side).

The first cover 21 includes the nozzle through-hole 215 in the back side (X2 side) thereof. The nozzle through-hole 215 is an opening into which the nozzle 3a (refer to FIG. 1) of the cylinder 3 is to be inserted. The first cover 21 includes a connection frame 216 in the front side (X1 side) thereof. The connection frame 216 is the portion to be connected to the stationary platen 2 (refer to FIG. 1), in the first cover 21. The first cover 21 includes a communication port 217 in the upper side (Z1 side). The communication port 217 is an opening which communicates with a communication port 226 (to be described below) of the second cover 22.

The door with window 214, which is the door disposed on the left-side plate 212, is configured to be supported openably and closably in the directions of the arrows by a hinge part 214b. The door with window 214 includes a transparent window 214a. An operator is able to visually check the periphery of the nozzle 3a (refer to FIG. 1) through the window 214a under the state where the door with window 214 is closed. It is noted that the door with window 214 may be disposed on the right-side plate 211, or may be disposed both on the right-side plate 211 and the left-side plate 212.

As shown in FIG. 1, the first cover 21 is attached on the X1 side to the stationary platen 2. Since the first cover 21 has the connection frame 216 (refer to FIG. 3) with an opening in the X1 side, the cylinder 3 is made to advance and retreat along the X direction under the state where the first cover 21 is attached to the stationary platen 2, whereby the nozzle 3a is allowed to be inserted into or retreated from the insertion port 2a (refer to FIG. 1) of the stationary platen 2.

The second cover 22 is the member disposed at the upper side (Z1 side) of the first cover 21. As shown in FIG. 3, the second cover 22 is formed in the substantially tubular shape configured with a front-side plate 221, a right-side plate 222, a left-side plate 223, and a back-side plate 224. The second cover 22 extends upward (Z1 direction) above the cylinder 3 (refer to FIG. 1). None of the plate members of the second cover 22 has an opening such as a slit or a hole. Therefore, the air heated in the periphery of the cylinder 3 is guided from the cylinder cover 10 to the purge cover 20, and passes inside the purge cover 20 in the order of the first cover 21 and the second cover 22, and is guided in the upward direction (Z1 direction) of the purge cover 20.

It is noted that if each of the plate members of the second cover 22 has an opening such as a slit or a hole, the heated air flows to the outside through the opening, and thus the surface of the second cover 22 reaches a high temperature. However, none of the plate members of the second cover 22 has an opening such as a slit or a hole, and thus the heated air is guided straightly in the upward direction (Z1 direction), resulting in suppressing the increase of the temperature of the surface of the second cover 22.

The second cover 22 includes a discharge port 225 in the upper side (Z1 side) thereof. The discharge port 225 is an opening to which the exhaust unit 23 (to be described below) is to be installed. The second cover 22 includes the communication port 226 in the lower side (Z2 side). The communication port 226 is an opening which communicates with the communication port 217 of the first cover 21. As described above, the second cover 22 is configured with the covering plate members as the side planes in the X-Y directions, and has the openings in each of the Z (Z1-Z2) directions. Accordingly, the second cover 22 functions as an exhaust passage for the heated air. The second cover 22 is joined to the first cover 21 with, for example, screws. It is noted that, in the second cover 22, the height of the discharge port 225 from the floor surface (not shown) is preferably set to a length conforming to the safety distance specified in, for example, JIS B 9718, in order to more effectively suppress the contact of an operator.

The exhaust unit 23 is configured to discharge the air heated in the periphery of the cylinder 3 to the outside. As shown in FIG. 3, the exhaust unit 23 includes the first exhaust plate 231 and the second exhaust plate 232. The description of the present embodiment is based on the exhaust unit 23 having, as one example, the dual structure in which these two exhaust plates are superposed on each other. The first exhaust plate 231 is a plate-like member disposed at the upper side (Z1 side) of the exhaust unit 23. As shown in FIG. 4A, the first exhaust plate 231 includes a plurality of oval exhaust holes 231h in each of the X-Y directions. The exhaust holes 231h are openings through which the air moving in the upward direction (Z1 direction) from the second cover 22 passes. An outer frame 231a is disposed at the outer peripheral area on the back surface side (Z2 side) of the first exhaust plate 231. The second exhaust plate 232 (to be described below) is housed in the outer frame 231a.

The second exhaust plate 232 is a plate-like member disposed under (at the Z2 side of) the first exhaust plate 231 in the exhaust unit 23. As shown in FIG. 4B, the second exhaust plate 232 includes a plurality of oval exhaust holes 232h in each of the X-Y directions. The exhaust holes 232h are openings through which the air moving in the upward direction (Z1 direction) from the second cover 22 passes. The shape and size of each of the exhaust holes 232h of the second exhaust plate 232 are identical to those of each of the exhaust holes 231h of the first exhaust plate 231. As shown in FIG. 4C, the plurality of exhaust holes 232h are disposed at positions where they do not overlap with the plurality of exhaust holes 231h planarly under the state where the two exhaust plates are superposed on each other. That is, the exhaust holes 232h of the second exhaust plate 232 are disposed so as to be opened at positions that alternate with the exhaust holes 231h of the first exhaust plate 231 in the X direction.

The second exhaust plate 232 has the lengths in the X-Y directions that can be housed in the first exhaust plate 231 (the outer frame 231a). Under the state where the first exhaust plate 231 and the second exhaust plate 232 are superposed on each other, a predetermined gap is disposed in the up/down direction (Z direction) between the first exhaust plate 231 and the second exhaust plate 232. The air guided to the exhaust unit 23 through the first cover 21 and the second cover 22 of the purge cover 20 passes through the exhaust holes 232h of the second exhaust plate 232, and thereafter passes through the gap described above and the exhaust holes 231h of the first exhaust plate 231, thereby being discharged to the outside. The exhaust unit 23 under the state where the first exhaust plate 231 and the second exhaust plate 232 are superposed on each other is installed to the discharge port 225 of the second cover 22. The exhaust unit 23 is joined to the outer peripheral part of the discharge port 225 with, for example, screws.

In the purge cover 20 configured as described above according to the first embodiment, the air heated in the periphery of the cylinder 3 is introduced from the cylinder cover 10 to the purge cover 20, passes through the inside of the purse cover 20 in the order of the first cover 21 and the second cover 22, and is guided in the upward direction (Z1 direction) of the purge cover 20. The air is guided to the exhaust unit 23 installed at the upper side of the purge cover 20 (the second cover 22), passes through the second exhaust plate 232 and the first exhaust plate 231 in this order, and is thereafter discharged to the outside.

The purge cover 20 according to the first embodiment described above produces, for example, the following effects. In the purge cover 20 according to the first embodiment, the exhaust unit 23 installed at the discharge port 225 of the purge cover 20 has the dual structure in which two exhaust plates are superposed on each other, and thus the structure enables effective suppression of the scattering to the outside of the molding material leaked out during the purge operation. The air heated in the periphery of the cylinder 3 is suppressed from staying inside the purge cover 20, and is discharged to the outside after passing through the first cover 21 and the second cover 22, thereby enabling suppression in the increase of the temperature of the surface of the purge cover 20. Accordingly, the purge cover 20 according to the present embodiment enables lowering of the temperature of the surface of the purge cover 20, while suppressing the scattering of the molding material.

In the purge cover 20 according to the first embodiment, the second cover 22 serving as an exhaust passage extends higher than the cylinder 3 in the upward direction (Z1 direction), and thus enables suppression of the contact of an operator, as compared with the purge cover in the prior art covering just the periphery of the nozzle 3a (the cylinder 3). In particular, the height of the second cover 22 from the floor surface is set to a length conforming to the safety distance specified in, for example, JIS B 9718, thereby more effectively enabling suppression of the contact of an operator.

In the purge cover 20 according to the first embodiment, the first exhaust plate 231 and the second exhaust plate 232 of the exhaust unit 23 are disposed at the positions where the respective exhaust holes thereof do not planarly overlap. Even if the molding material scatters in the upward direction (Z1 direction) during the purge operation, such a configuration suppresses the molding material from passing through the exhaust holes of the two exhaust plates, and accordingly enables more effective suppression of the scattering of the molding material to the outside.

SECOND EMBODIMENT

Figure 5A:
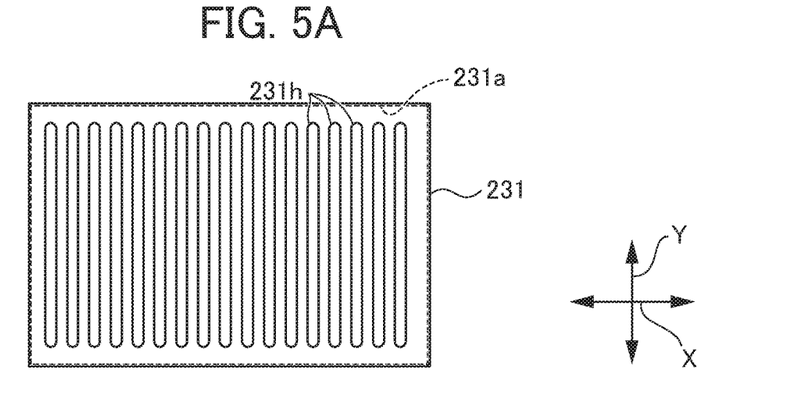
FIG. 5A is a plan view of a first exhaust plate 231 according to a second embodiment.
Figure 5B:
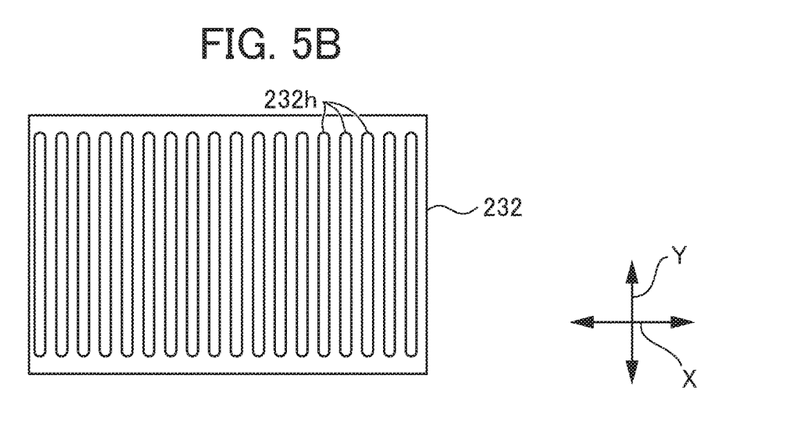
FIG. 5B is a plan view of a second exhaust plate 232 according to the second embodiment.
Figure 5C:
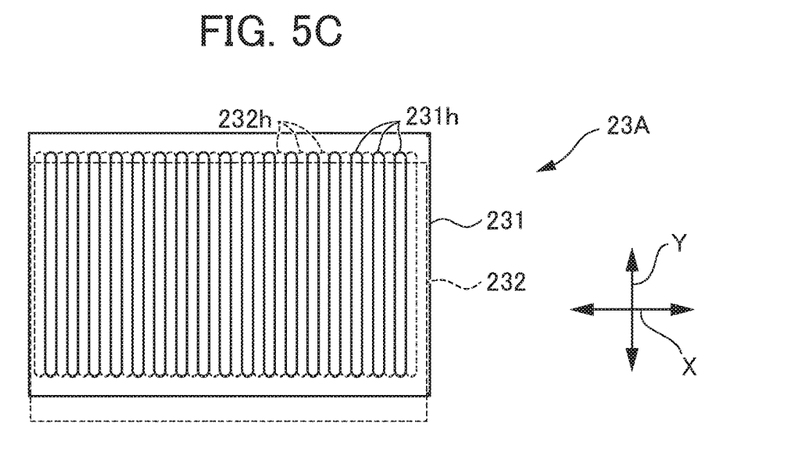
FIG. 5C is a plan view of an exhaust unit 23A.

A purge cover 20 according to the second embodiment has the exhaust unit 23A different in the shape of the exhaust holes, from that of the purge cover 20 according to the first embodiment. The other configurations of the purge cover 20 according to the second embodiment are the same as those according to the first embodiment. Therefore, each of FIG. 5A to FIG. 5C shows only the exhaust unit 23A, not showing the cylinder cover 10, the purge cover 20, or the entire injection molding machine 1. In the description and the drawings of the second embodiment, the members and the like equivalent to those according to the first embodiment are denoted by the same reference numerals in the first embodiment, and the duplicate descriptions thereof will be omitted.

FIG. 5A is a plan view of the first exhaust plate 231 according to the second embodiment. FIG. 5B is a plan view of the second exhaust plate 232 according to the second embodiment. FIG. 5C is a plan view of the exhaust unit 23A. As shown in FIG. 5A, the first exhaust plate 231 according to the second embodiment includes a plurality of slit-shaped exhaust holes 231h along the X direction. As shown in FIG. 5B, the second exhaust plate 232 according to the second embodiment includes a plurality of slit-shaped exhaust holes 232h along the X direction. The slit width of the exhaust holes 232h of the second exhaust plate 232 is the same as that of the exhaust holes 231h of the first exhaust plate 231.

As shown in FIG. 5C, in the second exhaust plate 232 according to the second embodiment, the plurality of exhaust holes 232h are arranged at positions where they do not planarly overlap with the plurality of exhaust holes 231h under the state where the first exhaust plate 231 and the second exhaust plate 232 are superposed on each other. That is, the exhaust holes 232h of the second exhaust plate 232 are arranged so as to be opened at positions that alternate with the exhaust holes 231h of the first exhaust plate 231 in the X direction. In the exhaust unit 23A according to the second embodiment described above, the first exhaust plate 231 and the second exhaust plate 232 are disposed at positions where the respective exhaust holes thereof do not planarly overlap, and accordingly this configuration enables more effective suppression of the scattering of the molding material, as in the exhaust unit 23 according to the first embodiment.

THIRD EMBODIMENT

Figure 6A:
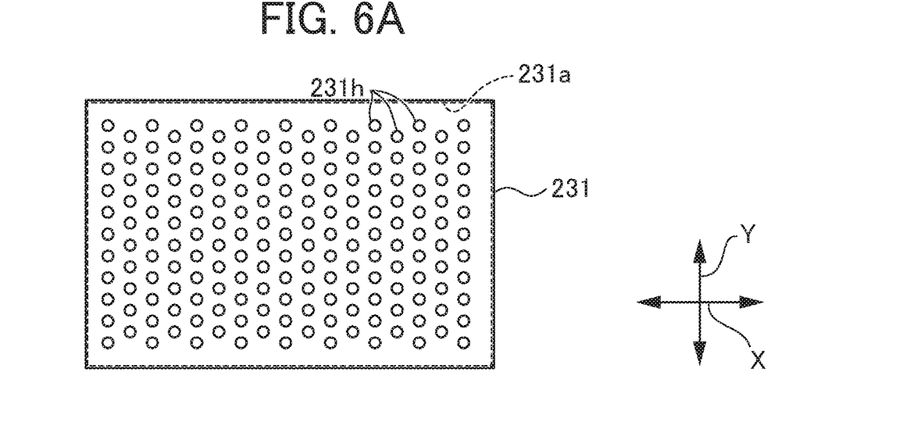
FIG. 6A is a plan view of a first exhaust plate 231 according to a third embodiment.
Figure 6B:
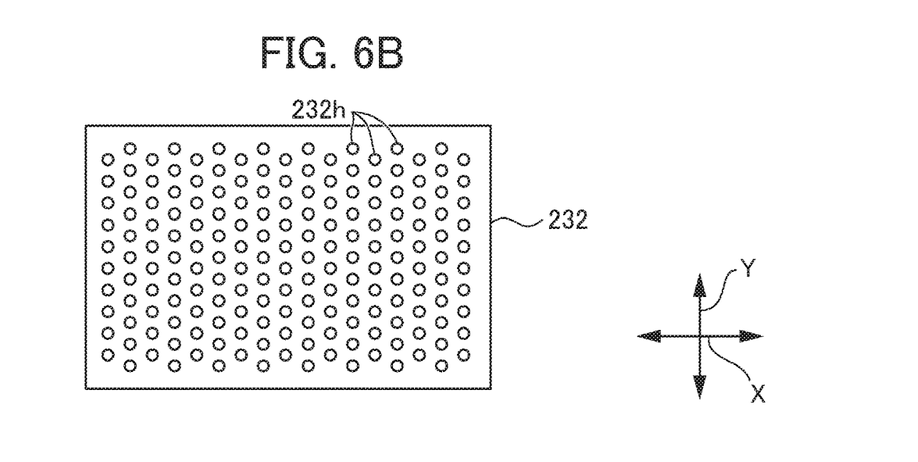
FIG. 6B is a plan view of a second exhaust plate 232 according to the third embodiment.
Figure 6C:
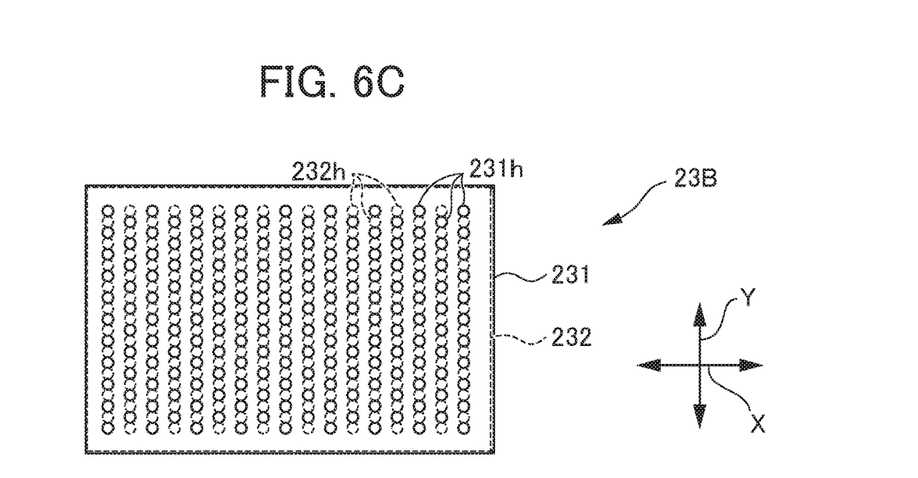
FIG. 6C is a plan view of an exhaust unit 23B.

A purge cover 20 according to the third embodiment has the exhaust unit 23B different in the shape of the exhaust holes, from that of the purge cover 20 according to the first embodiment. The other configurations of the purge cover 20 according to the third embodiment are the same as those according to the first embodiment. Therefore, each of FIG. 6A to FIG. 6C shows only the exhaust unit 23B, not showing the cylinder cover 10, the purge cover 20, or the entire injection molding machine 1. In the description and the drawings of the third embodiment, the members and the like equivalent to those according to the first embodiment are denoted by the same reference numerals in the first embodiment, and the duplicate descriptions thereof will be omitted.

FIG. 6A is a plan view of the first exhaust plate 231 according to the third embodiment. FIG. 6B is a plan view of the second exhaust plate 232 according to the third embodiment. FIG. 6C is a plan view of the exhaust unit 23B. As shown in FIG. 6A, the first exhaust plate 231 according to the third embodiment includes a plurality of circular exhaust holes 231h along the X-Y directions. As shown in FIG. 6B, the second exhaust plate 232 according to the third embodiment includes a plurality of circular exhaust holes 232h along the X-Y directions. The size of the exhaust holes 232h of the second exhaust plate 232 is the same as that of the exhaust holes 231h of the first exhaust plate 231.

As shown in FIG. 6C, in the second exhaust plate 232 according to the third embodiment, the plurality of exhaust holes 232h are arranged at positions where they do not planarly overlap with the plurality of exhaust holes 231h under the state where the first exhaust plate 231 and the second exhaust plate 232 are superposed on each other. That is, the plurality of exhaust holes 232h are disposed so as to be opened at positions that alternate with the exhaust holes 231h of the first exhaust plate 231 in the X-Y directions. In the exhaust unit 23B according to the third embodiment described above, the first exhaust plate 231 and the second exhaust plate 232 are disposed at positions where the respective exhaust holes thereof do not planarly overlap, and accordingly this configuration enables more effective suppression of the scattering of the molding material, as in the exhaust unit 23 according to the first embodiment.

The embodiments according to the present invention have been described so far. The present invention is not limited to the embodiments described above. Various modifications and changes are available, such as the modifications to be described below, and these are also included in the technical scope of the present invention. The effects described in the embodiments have been introduced merely as the most preferable effects produced by the present invention. The effects produced by the present invention are not limited to those described in the embodiments. It is noted that although the embodiments described above and the modifications to be described below may be combined and used as appropriate, the detailed descriptions thereof will be omitted.

MODIFICATIONS

In the purge cover 20 according to the first embodiment, the first cover 21 and the second cover 22 may be integrated as one cover body. A heat insulating paint or a heat dissipation paint may be applied to the surface of the purge cover 20. The first cover 21 according to the first embodiment may be configured with the side plate (the right-side plate 211 or the left-side plate 212) disposed only with a transparent window, instead of the door with window 214. Alternatively, the first cover 21 may be configured with the side plate which has an openable/closable door-like part, not having a transparent window. The exhaust unit 23 according to the first embodiment may be configured with a heat insulating member having air permeability sandwiched by two exhaust plates. The exhaust unit 23 may be configured with three or more exhaust plates.

In the first embodiment, each of the exhaust holes 231*h* (232*h*) may have an oval shape extending in the X direction or in an oblique direction, or may have, for example, an ellipse shape or an egg shape. The exhaust holes 231*h* and the exhaust holes 232*h* may be arranged regularly or may be arranged at random, as long as they do not planarly overlap under the state where the first exhaust plate 231 and the second exhaust plate 232 are superposed on each other. The shapes, sizes, numbers, etc. of the exhaust holes 231*h* and the exhaust holes 232*h* of the two exhaust plates may be identical or may be different.

In the second embodiment, each of the exhaust holes 231*h* (232*h*) may have a slit shape in which the opening extends in the X direction or in an oblique direction. The widths of the slits of the exhaust holes 231*h* (232*h*) according to the second embodiment may be uniform or may be non-uniform. Each of the slits may be tapered in width in the direction in which the opening extends. The numbers of the exhaust holes 231*h* and the exhaust holes 232*h* of the two exhaust plates may be identical or may be different.

In the third embodiment, in an example, each of the exhaust holes 231*h* (232*h*) may have a quadrangular shape, a triangular shape or a trapezoidal shape, or may have a polygonal shape, not limited to a circular shape. The exhaust holes 231*h* and the exhaust holes 232*h* may be arranged regularly or may be arranged at random, as long as they do not planarly overlap under the state where the first exhaust plate 231 and the second exhaust plate 232 are superposed on each other. Moreover, the shapes, sizes, numbers, etc. of the exhaust holes 231*h* and the exhaust holes 232*h* of the two exhaust plates may be identical or may be different.

EXPLANATION OF REFERENCE NUMERALS

1: INJECTION MOLDING MACHINE, 2: STATIONARY PLATEN, 3: CYLINDER, 3*a*: NOZZLE, 4: WATER-COOLING JACKET, 10: CYLINDER COVER, 20: PURGE COVER, 21: FIRST COVER, 22: SECOND COVER, 23, 23A, 23B: EXHAUST UNIT, 215: NOZZLE THROUGH-HOLE, 225: DISCHARGE PORT, 231: FIRST EXHAUST PLATE, 232: SECOND EXHAUST PLATE, 231*h*, 232*h*: EXHAUST HOLE

What is claimed is:

1. A purge cover for injection molding machine disposed in a periphery of a nozzle of a cylinder of an injection molding machine, the purge cover for injection molding machine comprising:

a cover body having a nozzle through-hole allowing the nozzle of the cylinder to pierce through, an exhaust passage extending higher than the cylinder in an upward direction, and a discharge port communicating with the exhaust passage; and     a plurality of exhaust plates disposed at the discharge port of the cover body, wherein     the plurality of exhaust plates have exhaust holes for air moving in the upward direction from the cover body, and the exhaust holes are arranged so as not to planarly overlap when the plurality of exhaust plates are disposed at the discharge port of the cover body.

2. The purge cover for injection molding machine according to claim 1, wherein the exhaust hole has an oval shape or a slit shape.

3. The purge cover for injection molding machine according to claim 1, wherein the exhaust hole has a circular shape.

\* \* \* \* \*